United States Patent [19]

Washburn et al.

[11] Patent Number: 4,774,988
[45] Date of Patent: Oct. 4, 1988

[54] METHOD FOR MEASURING EDGE PROFILE OF AN ELONGATED MEMBER

[75] Inventors: Steven L. Washburn, Federal Way; Stanley L. Floyd, Enumclaw, both of Wash.

[73] Assignee: Weyerhaeuser Company, Tacoma, Wash.

[21] Appl. No.: 95,373

[22] Filed: Sep. 11, 1987

[51] Int. Cl.$^4$ ............................................. B27B 1/00
[52] U.S. Cl. ......................................... 144/357; 83/71; 364/475; 364/478
[58] Field of Search ............... 364/475, 478; 250/563; 73/852; 356/446; 144/356, 357; 83/71, 364, 367, 368

[56] References Cited

U.S. PATENT DOCUMENTS

| | | |
|---|---|---|
| 4,085,512 | 4/1978 | Bod et al. |
| 4,207,472 | 6/1980 | Idelsohn et al. ............ 250/563 |
| 4,546,440 | 10/1985 | Palmberg ...................... 144/357 |
| 4,548,247 | 10/1985 | Eklund .......................... 144/357 |
| 4,589,288 | 5/1986 | Porter et al. ................... 73/852 |
| 4,606,645 | 8/1986 | Matthews et al. ............. 356/446 |
| 4,640,160 | 2/1987 | Hards ............................. 83/71 |

OTHER PUBLICATIONS

R. Pirlet et al., 1978. CRM Develops Laser–Based Hot Strip Flatness Gauge. Iron and Steel Int'l., Aug. 1978, pp. 215–221.

Primary Examiner—W. Donald Bray

[57] ABSTRACT

The present invention is a method of determining edge profile of one or both edges of an elongated member such as a piece of lumber or structural timber. This can be done at high speed as the member is conveyed past a scanning station where it is subject on the conveyor to translational and/or rotational movement relative to a baseline. The baseline is located generally parallel to the longitudinal axis or centerline of the member. At the leading end of the member the instantaneous edge height above the baseline is measured at three spaced apart locations. These measurements are continued along the member with each sampled portion substantially overlapping the previously sampled portion. For each individual sampled portion any deviation from linearity of the edge at the interior measurement position is determined from a chord drawn between the end measurement positions. Knowing these deviations the edge profile can be readily computed for the member. This is most readily done by dividing twice each deviation by the square of the distance between adjacent scanning positions to obtain a second derivative of the edge contour at the measured location. The overall edge contour is then obtained by double integrating the second derivatives obtained over the length of the measured member.

9 Claims, 4 Drawing Sheets

SCANNER LOCATIONS

INCREMENTAL CROOK=$d=(Y_a+Y_c)/2-Y_b$ $$\frac{d^2y}{dx^2}=Y''=\frac{d}{X^2}$$

FOR MEASURED EDGE PORTION OF A $d=(1+4.5)/2-2.75=0$ $Y''=\frac{2(0)}{3^2}=0$

FOR MEASURED EDGE PORTION OF B $d=(1+4.5)/2-3.5=-0.75$ $Y''=\frac{2(-0.75)}{3^2}=-0.17$

LUMBER CROOK MEASUREMENT

INCREMENTAL CROOK = $d = (Y_a + Y_c)/2 - Y_b$ $$\frac{d^2y}{dx^2} = Y'' = \frac{d}{X^2}$$

FOR MEASURED EDGE PORTION OF A $$d = (1 + 4.5)/2 - 2.75 = 0$$
$$Y'' = \frac{2(0)}{3^2} = 0$$

FOR MEASURED EDGE PORTION OF B $$d = (1 + 4.5)/2 - 3.5) = -0.75$$
$$Y'' = \frac{2(-0.75)}{3^2} = -0.17$$

METHOD FOR MEASURING EDGE PROFILE OF AN ELONGATED MEMBER

BACKGROUND OF THE INVENTION

The present invention is a method of measuring edge profile of one or more edges of an elongated member, such as a piece of lumber, as the member advances past a scanning station on a conveyor. The method is particularly well adapted for use when transport conditions induce translational and/or rotational movement in the member being measured relative to an arbitrary baseline located generally parallel to the longitudinal axis or centerline of the member. The method further includes estimating deviation from linearity over any given length of the member for quality control purposes.

The knowledge of any deviations from linearity is an important aspect of quality determination in elongated members such as metal structural elements, lumber or sawn timbers. Lumber may be taken as exemplary. Virtually every one of the untold millions of pieces of lumber entering the market place are individually examined by a skilled quality control inspector. Each piece is assigned to a grade determined by rules which are recognized on an industry-wide basis. Graders working in sawmills are subject to certification and inspection by head graders from industry-sponsored associations. Their job involves high skill and requires the ability to internalize all of the complex grading rules and assign a proper grade to lumber after a visual inspection made within a few seconds time.

Lumber is graded using rules dependent on its intended application. Boards intended for remanufacture into items such as millwork or furniture are graded primarily on visual appearance and defects which might affect structural strength are given only minor consideration. On the other hand, appearance is of much less importance in lumber intended for structural uses and defects which affect strength are given heavy weighting. The size of knots, expressed as their estimated cross sectional area, and their location in a piece of lumber are of primary consideration. Other defects such as shake, splits, decay, or density are also considered. Defects which may be either of visual or structural importance, such as planer skip and wane, also enter into grading rules.

Warpage is another type of defect which, while it does not affect structural strength, is considered in grading. Warpage is generally a combination of one or more of four types: twist, bow, cup or crook. Twist is caused by cross sectional rotation along the length of the piece. Crook is deviation from linearity of the edges of a piece of lumber when it is laid on one of its widest faces. Cup is lack of planarity across the faces at a given point. Bow is warpage 90° displaced from that identified as crook and is a deviation from end-to-end planarity of the faces. When laid on one of its faces, bow causes the lumber to be shaped like the rocker of a rocking chair.

The grading rules set allowable limits within any given grade for all of the above defects. Currently these are judged and measured only by the skilled eye of the grader. All can be precisely measured using conventional measuring tools with reference surfaces such as flats or straight edges. However, this it not possible in the few seconds available to a grader and visual estimates must suffice.

As one example, the Southern Pine Inspection Bureau, an industry sponsored grading association, has established the following limits for crook in southern pine dimension lumber.

|  | Permissible Crook | |
| --- | --- | --- |
|  | 4 ft (1.22 m) | 20 ft (6.10 m) |
| No. 1 | 3/16 in (4.8 mm) | 1 1/32 in (28.2 mm) |
| No. 2 | ¼ in (6.4 mm) | 1⅜ in (34.9 mm) |
| No. 3 | ⅜ in (9.5 mm) | 2 1/16 in (52.4 mm) |

It should be noted that the limits listed under 4 ft (1.22 m) do not apply to pieces of lumber only four feet long, but to any possible four foot section within a longer piece. The same is true of the values listed in the 20 ft (6.10 m) column. Very obviously a heavy, if not impossible, burden is placed on the grader to estimate within such precise tolerances. Even so, graders are expected to maintain a minimum of 95% accuracy in assignment of lumber to proper grade.

The technology to enable machine grading or machine assisted grading has been relatively slow to develop, especially for structural grades of lumber. Many of the automated grading systems proposed to date use gray scale-type scanners which attempt to recognize knots by their darker colors. Most of these systems also require some form of human input. Idelsohn et al, U.S. Pat. No. 4,207,472, can be considered as exemplary of electro-optical grading. Dahlstrom, in U.S. Pat. No. 3,983,403, teaches a method for recognition and measurement of wane on lumber. Wane is a condition where a corner is not square but is truncated by a portion of the original log surface. Matthews et al, in U.S. Pat. No. 4,606,645, disclose a scanner which can measure grain direction relative to three mutually orthogonal axes. This scanner marks a major advance over those previously known for grading lumber based on characteristics which affect its structural strength.

In addition to being visually graded, some lumber is also machine stress rated. This involves bending the piece, usually as a plank, to determine modulus of elasticity in flexure. If the estimated M.O.E. is below some minimum value, the lumber is placed in a lower grade. Porter et al, in U.S. Pat. No. 4,589,288, disclose such a method particularly adapted for use with plywood.

A number of methods have been proposed for measuring sweep in logs to assist in making bucking and sawing decisions. Sweep is end-to-end curvature and may be considered as analogous to crook in lumber. Typical of these are U.S. Pat. No. 4,548,247 to Eklund and U.S. Pat. No. 4,640,160 to Hards. In Eklund a curved or sweepy log is first mechanically sensed and processed to yield a curved cant by creating faces parallel to the centerline of the log. The cant is then resawn along a similar curved path parallel to the faces. Hards discloses a scanning system which examines log length, diameter, and sweep in order to make bucking decisions prior to sawing. However, this inventor describes the scanners only as "one of a large variety of commercially available laser-scanning devices" and offers no more information. Both of these systems operate at relatively low speed. Hards discloses operating speeds in the range of 45–75 m/min. Pirlet et al, *Iron and Steel International,* August 1978, pp. 215–221, describe a method for measurement of flatness of a steel strip. This is done by measuring the center and edge heights at given time interval using a laser and photodiode camera arrangement. A computer then calculates flatness indices which can be used for process control. The system compensates for any vertical motion on the strip by presuming the motion to be the same at the center and both edges.

None of the systems noted would be useful for measuring crook in lumber or similar elongated members traveling at the high speeds normally found in modern sawmills. The present inventors believe that theirs is the first method capable of accurately measuring edge profiles in elongated structural members, such as lumber, at speeds which may be typically in the range of 300–350 m/min.

SUMMARY OF THE INVENTION

The present invention is a method of determining edge profile of an elongated member as the member advances past a scanning station and is subject to transport forces which can cause translational and/or rotational movement. This movement is presumed to be relative to a scanning baseline which is located generally parallel to the longitudinal axis or centerline of the member. The method involves sampling a first longitudinal portion at the leading edge of the member. The instantaneous edge distance from the baseline is measured at three spaced apart locations. For convenience of terminology, two of these measurement locations are termed end positions with the third being located between them and termed the interior position. Most preferably the interior position is midway between and colinear with the end positions, although this is not essential. After the member has advanced past the scanning station for an incremental distance from the first measurement position, the instantaneous edge distance from the base line is again measured at the three spaced apart locations for the second portion. The second portion should substantially overlap the first portion. Generally speaking about a 90–98% overlap is preferable for successively scanned portions of the member.

As the member continues to advance past the scanning station a plurality of successive longitudinal portions along the member are similarly examined until the trailing end of the member is reached.

Either during or at the conclusion of the scanning steps, any deviation from linearity is determined for each sampled portion. This is done by projecting a chord between the end measurement positions and noting any displacement at the interior measurement position.

Finally, using the above deviations, an edge profile for the member may be computed. While this may be done by various methods, it is convenient to note that by dividing twice the midpoint deviation of any longitudinal portion by the square of half the distance between the end measurement positions, a value is obtained which is indicative of the second derivative of the edge curvature at each of the portion midpoints. By double integrating these second derivatives over the measured length of the member, a mathematical representation of the edge profile is obtained.

No midpoint deviation values are obtained for a portion at each end of the member for a length equivalent to half the distance between the end measurement positions. This lack of information on these short portions may be satisfied by extrapolating the computed curvature from adjacent measured sections so that a mathematical representation is obtained for the edge profile over the entire length of the member. It is within the capability of the invention to further specify a base length which is some increment of the overall length of the member and compute the deviation from linearity of the edge for any possible base length location along the member.

Using the method just described it is not necessary for the member to be in contact with the scanning baseline or even remain parallel to the baseline. The term parallel is used here in a general sense since it will be understood that the axis or centerline of the member being measured will probably not be a straight line. Thus, the method compensates for both translational and rotational movements of the member relative to the baseline which may occur during the scanning step.

It is an object of the present invention to provide a method for measuring the edge profile of moving elongated members.

It is also an object of the invention to provide a method for measuring edge profile in an elongated member which is subject to translational and/or rotational movement relative to a scanning baseline while measurements are being made.

It is another object of the invention to provide a method for measurement of crook in lumber at high operating speeds.

It is a further object to provide a method for measuring edge profile of members for providing quality grading information.

These and many other objects will become readily apparent to those skilled in the art upon reading the following detailed description taken in conjunction with the drawings.

DESCRIPTION OF THE PREFERRED EMBODIMENTS

Figure 1:
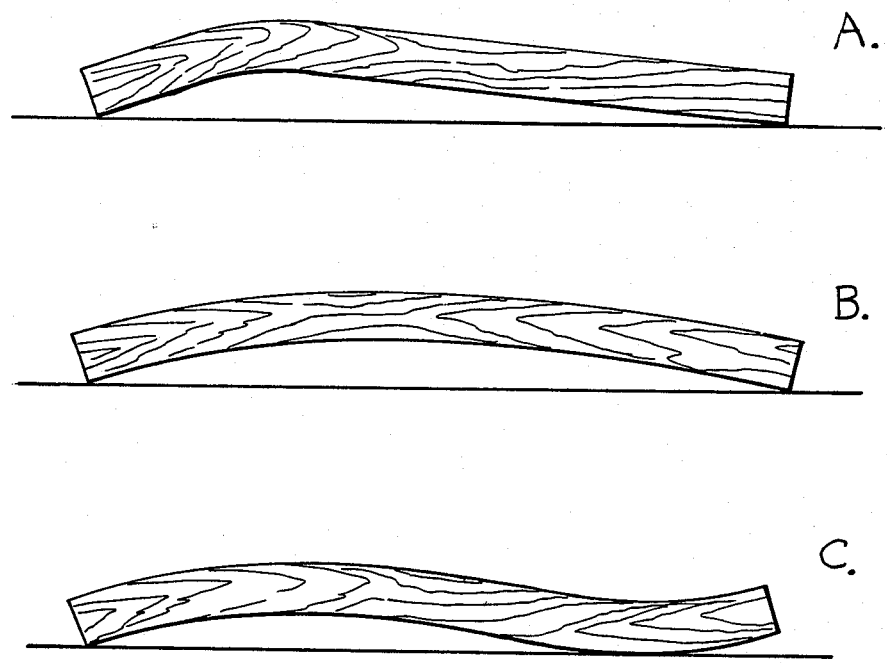
FIGS. 1A through C are highly exaggerated representations of some of the configurations of crook commonly present in lumber.

The method of the present invention is useful for determination of the edge contour of any elongated member which can be conveyed past a scanning station. For simplicity the following description will be limited to lumber as exemplary of a suitable elongated member. However, it will be fully understood by those skilled in the art that the invention is not limited to lumber.

The large old growth timber in the United States now comprises only a small percentage of the total logs harvested from our forests. An increasingly large percentage of the logs now going to sawmills are second or later crops grown on tree plantations. These logs will typically be smaller than 60 cm at the butt end and, in many cases, even half or less of that size. Economics have dictated that these smaller logs must be processed at very high speeds with automated equipment so that labor costs are minimized. Very often lumber moving through a modern sawmill will be conveyed at speeds in the range of 300–375 m/min., or even higher in some instances. These high speeds place severe demands upon equipment since any machine center which operates at lower speed can impose a severe bottleneck in the flow pattern through a sawmill.

Machines which attempt to assist grading using mechanical or electro-optical scanners are not immune from the requirement of having to operate at high mill speeds. To consider measurement of crook as one example, if a piece of lumber could be held so that it is contact with a linebar and moved by a scanning station at slow speed, the measurement task would be greatly simplified. However, at speeds in the neighborhood of 350 m/min., it is virtually impossible to keep lumber in true alignment along its longitudinal axis as it moves along a conveyor. Instead, it has limited translational movement from side to side of the conveyor and may also have rotational movement in which one end moves toward one edge of the conveyor while the opposite end moves toward the other. These movements are held within relative limits so that the lumber does not fall off the conveyor, but nevertheless they are present and must be dealt with. At a processing station the lumber must be singulated and handled at a speed which will be able to keep up with the conveyor supplying the station. This places heavy demands on processing equipment, including that which might have a grading function.

As noted earlier, if lumber could be conveyed against a linebar or against a series of rigidly positioned rolls, measurement of crook would be greatly simplified. This has been found to be impractical for various reasons. Normally the lumber must be held against the linebar by rollers and these so often require so much force that the lumber is actually bent into conformation so that a true measurement of crook is not possible.

The present invention is designed to cope with mill conditions and provide accurate measurement of crook under circumstances where the member being measured can have translational and/or rotational movement with regard to a baseline while the measurements are being taken.

Reference to FIG. 1 will show some of the forms which crook can assume. In FIG. 1A the piece is essentially straight for 80% of its length. It then has a sharp curve which gives it a configuration analogous to that in a hockey stick. If FIG. 1B the curve is essentially uniform. Here the curvature can be modeled as a segment of a circle or parabola. In FIG. 1C the piece is recurved so that mathematical modeling of the entire length is somewhat more complex.

Figure 2:
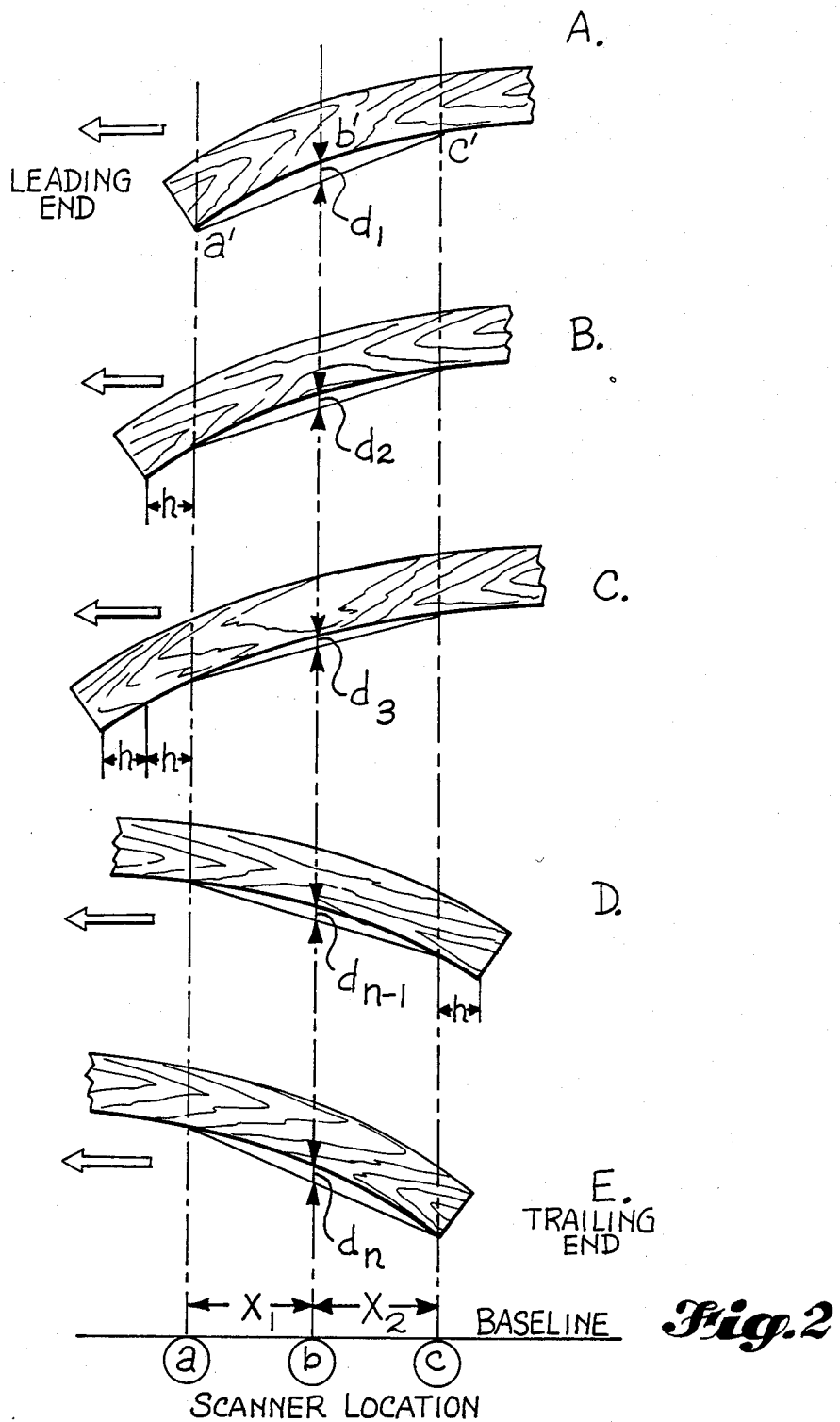
FIGS. 2A through E are highly exaggerated diagrams of a piece of lumber passing through the scanning stations.

FIG. 2 is representative of a piece of lumber having considerable crook as it moves past the scanning station. The three scanners in this case are equidistantly located so that $x_1$ and $x_2$ are equal. The center scanner need not be equidistant between the end scanners although it is preferable that this be so since the necessary software for carrying out computations is considerably simplified.

In FIG. 2A the piece of lumber has just advanced to the point that it is seen by all three scanners. The distance normal to the baseline will be measured at points a', b' and c'. Any lack of linearity will be shown as a distance $d_1$ measured between a chord drawn between points a' and c' at the location b' of the middle scanner. After the lumber has advanced along the conveyor a distance h, as seen in FIG. 2B, the scans are repeated and any lack of linearity is seen as distance $d_2$. This is repeated along the length of the piece of lumber as shown in FIGS. 2C and D until ultimately the trailing end of the lumber is reached as shown in FIG. 2E.

In one installation the three scanners are equidistantly spaced on 508 mm (2 ft.) centers. Any of the various types of commercially available scanners suitable for locating edge position can be used in the practice of the present invention. One such scanner could be a laser with a camera using a diode array similar to that described in the aforementioned article to Pirlet et al. Lumber was conveyed past the scanners at speeds as high as 350 m/min. The installation was able to measure crook with an accuracy of approximately ±1 mm in lumber 6.10 m (20 ft) in length.

The lumber was advanced on the conveyor approximately 50 mm (2 in) between successive scans. Successive scans were overlapped by about 96%.

Figure 3:
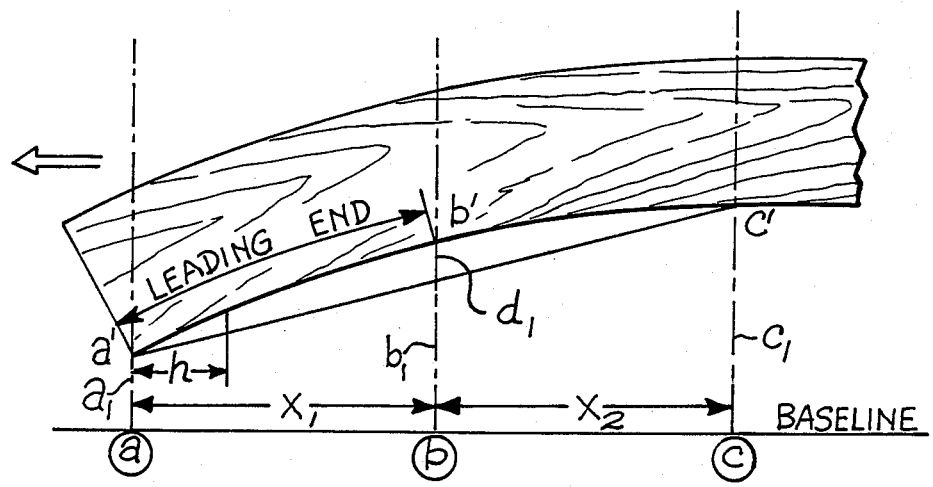
FIG. 3 is a representation of FIG. 2A drawn to larger scale.

Reference should now be made to FIG. 3 which is an enlarged version of FIG. 2A. In this figure it will again be assumed that $x_1$ and $x_2$ are equal in length; i.e., $x_1 = x_2 = \bar{x}$. The first scan shows that the edge of the lumber has distances $a_1$ and $c_1$ from the baseline at the end scanners and $b_1$ at the interior scanner. A chord drawn between points a' and c' shows that there is crook over this length equal to $d_1$, measured at the central scan point b'. The length of $d_1$ is given simply by the formula $[(a_1+c_1)/2] - b_1$. The second derivative, or curvature between a' and c' on the lumber, is given by the formula:

$$Y'' = 2d_1/x^2.$$

Note for future reference that the first measurement is taken a distance $\bar{x}$ from the leading end of the lumber and the last measurement is taken a like distance from the trailing end.

Knowing all of the values $Y''$ along the board, the edge profile may be determined by double integration. Here it is presumed that the x axis falls along the baseline and the Y axis is normal to the baseline in the plane of the lumber being scanned.

The following are exemplary of the calculations that need to be made to determine edge profile.

$$Y_i'' = \text{curvature at the ith scan point} \quad (1)$$

The first derivative or slope of the curve with respect to x is obtained by integrating the resuls from equation (1) via the following partial sums integration technique.

$$Y'_j = h \sum_{i=1}^{j} Y''_i + k_1 \quad (2)$$

where
 $Y'_j$ = slope at the jth scan point
 h = distance between scan points
 $k_1$ = first constant of integration We can then obtain the edge location at any scan position by integrating the results from equation (2).

$$Y_k = h \sum_{j=1}^{k} Y'_j + k_2 \quad (3)$$

where
 $Y_k$ = the edge location at the kth scan position
 $k_2$ = second constant of integration Equation (3) involves two constants of integration. Applying the boundary conditions which, in essence, mathematically places the lumber against the baseline at locations $\bar{x}$ from each end.

$$Y_1 = Y_n = 0 \tag{4}$$

$k_1$ and $K_2$ are found as follows:

$$k_1 = h(Y''_1 - A)/(n-1), \text{ and} \tag{5}$$

$$k_2 = -h(k_1 + hY''_1) \text{ where} \tag{6}$$

where $$A = \sum_{i=1}^{n}(n+1-i)Y''_i \tag{7}$$

Equation (3) can be used to compute the edge locations at any one of the n scan points. However, as was noted earlier, edge locations for a distance x will be missing at either end of the piece. For the leading and trailing portions of the board not covered by equation (3) one of the following extrapolation techniques can be used.

(A) Constant Curvature at Both Ends
1. Find $\bar{Y}_1''$, the average of several (from 3-10) second derivatives nearest the leading edge of the piece.
2. Find $\bar{Y}_t''$, the average of several (from 3-10) second derivatives nearest the trailing end of the piece.
3. Set second derivatives $Y''_{-L+1}$ through $Y''_o$ equal to $\bar{Y}''_1$, where L=number of scan intervals in scanner spacing, $\bar{x}$
4. Set second derivatives $Y''_{n+1}$ through $Y''_{n+L}$ equal to $\bar{Y}''_t$.
5. Integrate $Y'''_{-L+1}$ through $Y'''_{n+L}$ twice as previously described.

(B) Linear Extrapolation Using Nearest Slope
1. Find $\bar{Y}'_1$, the average of several first derivatives nearest the leading end of the piece.
2. Find $\bar{Y}'_t$, the average of several first derivatives nearest the trailing end of the piece.
3. Set first derivatives $Y'_{L+1}$ through $Y'_o$ equal to $Y'_1$.
4. Set first derivatives $Y'_{n+1}$ through $Y'_{N+L}$ equal to $\bar{Y}'_t$.
5. Integrate $Y'_{-L+1}$ through $Y'_{n+L}$ once as previously described.

The resultant edge profile can then be passed to a crook detection algorithm in an appropriate computer where the crook of each possible candidate piece that can be made from the scanned piece is determined.

As noted earlier, it is preferable that the scanning stations be spaced equidistantly. It will be readily evident that the mathematics can be extended to the case of non-equally spaced scanners.

Figure 4:
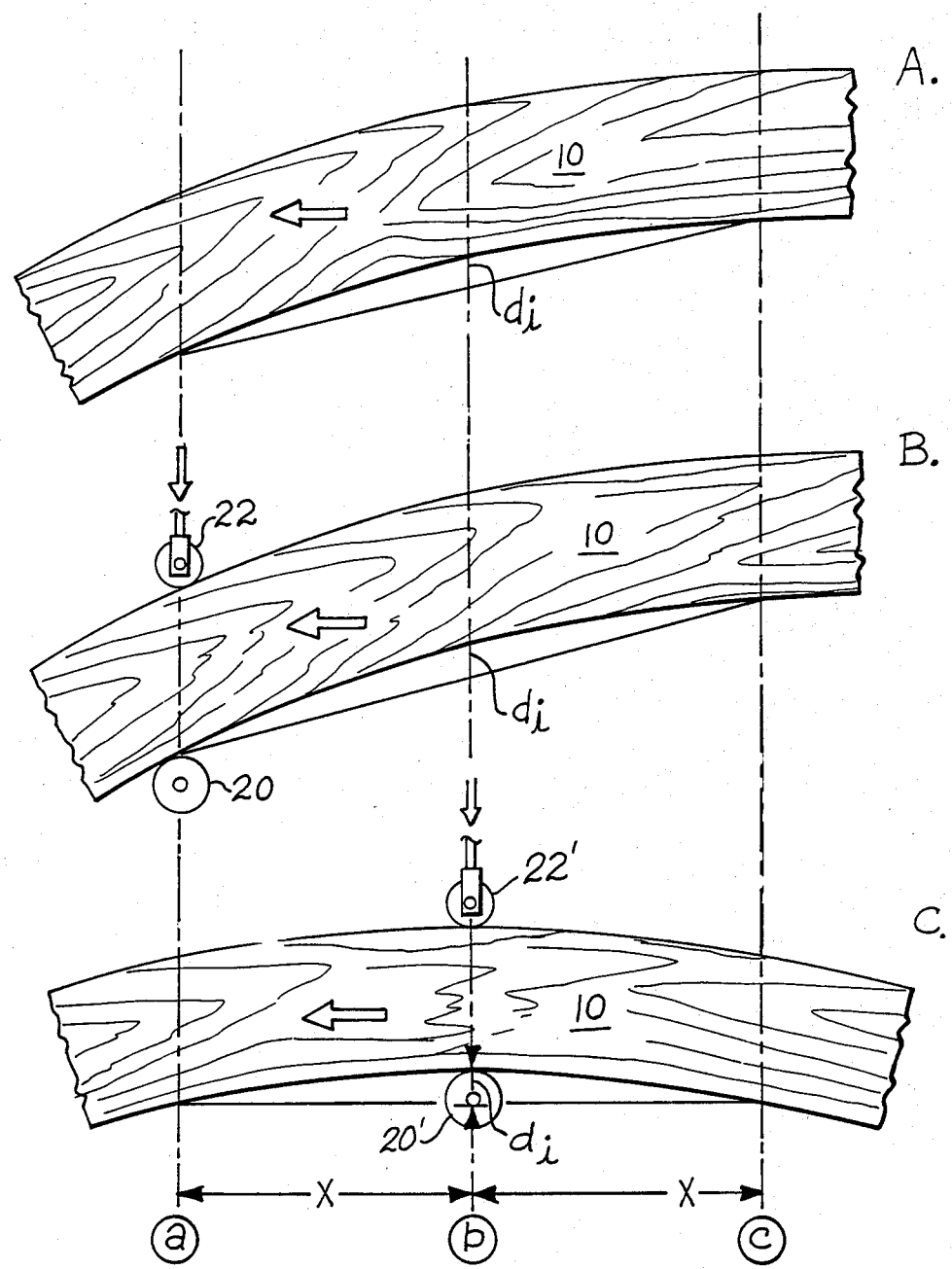
FIGS. 4A and B show alternate configurations for a scanning station.
Figure 5:
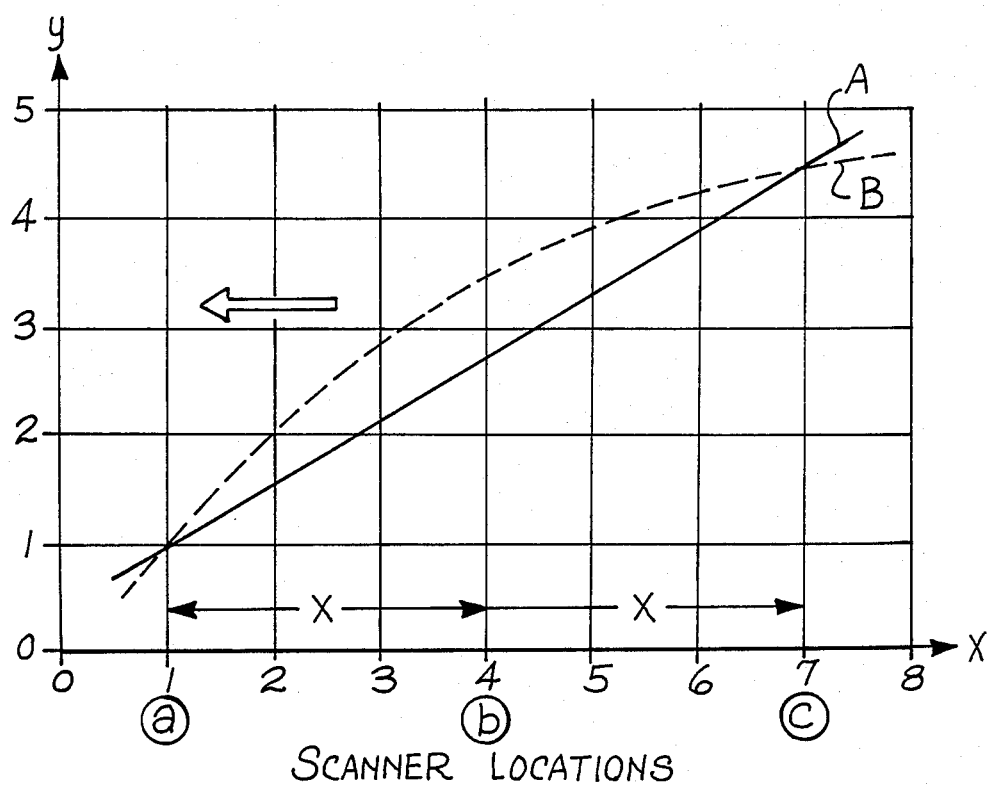
FIG. 5 shows the method by which the second derivative of the edge contour can be calculated for any scanned portion.

FIG. 4 shows several possible configurations of the scanning station. In FIG. 4A the lumber being measured is entirely free floating with regard to the base line. No attempt is made to constrain it. In FIG. 4B the lumber 10 is forced against a single fixed reference roller 20 by pressure roller 22. Since the position of the contact point with roll 20 is determined relative to the baseline, only two scanners are necessary. Roll 20 can be at either end or in the middle of the piece as is shown in FIG. 4C. FIG. 5 shows briefly how the second derivative is determined for a piece of straight lumber traveling at a slight angle to the baseline and for a piece of lumber containing some crook. It can be seen that the second derivative $Y''$ for the straight lumber A is 0 while this is a positive value for the lumber with crook B.

The design of software for the integration steps and for crook determination is considered to be well within the capability of an average skilled programmer. Normally the output from the sensors will be converted to digital form where it will be input into a dedicated minicomputer or other computer having adequate storage capability and operating speed. For lumber it is convenient to use a baseline of 1.22 m (4 ft) as the smallest number used for calculation of crook. This is fully consistent with the grading rules and with the visual procedure used by lumber graders.

Having now disclosed the best mode known to the inventors of carrying out their invention, it will be evident to those skilled in the art that many variations are possible without departing from the scope of the invention. The invention is to be considered as limited only by the following claims.

We claim:
1. A method of determining edge profile of one edge of an elongated member as said member advances past a scanning station and is subject to translational and/or rotational movement relative to a scanning baseline located generally parallel to the longitudinal axis of the member which comprises:

for a first sampled longitudinal portion at the leading end of the member, determining the instantaneous edge distance from the baseline at three spaced apart measurement locations, two of said measurement locations being termed end positions and the third being located between said end positions and termed the interior position;

continuing to advance the member past the scanning station and, at an incremental distance from and in similar fashion to the first sampled portion, determining instantaneous edge distance from the baseline at the three spaced apart measurement locations for the second portion, said second portion substantially overlapping said first portion;

further advancing the member and making measurements at a plurality of successive longitudinal portions along the member until the trailing end of the member is reached;

for each individual sampled portion, determining any deviation from linearity of the edge at the interior measurement position from a chord drawn between the end measurement positions; and using the deviations, computing an edge profile of the member.

2. The method of claim 1 in which the three measurement positions are essentially equally spaced along the measurement baseline.

3. The method of claim 1 in which the three measurement positions are not equidistantly spaced along the measurement baseline.

4. The method of claim 1 in which one measurement position is fixed relative to the baseline and the edge of the member is forced against the fixed position so that only two measurements need be made of each sampled section.

5. The method of claim 1 in which the edge profile is computed by dividing twice the midpoint deviation by the square of half the distance between the end measurement positions to obtain a value indicative of the second derivative of the edge curvature at each of said midpoints; and double integrating said second derivatives over the measured length of the member to obtain a mathematical representation of the edge profile.

6. The method of claim 1 in which adjacent sampled sections overlap at least about 90%.

7. The method of claim 1 which further includes estimating edge profile at each end portion of the member by extrapolating from adjacent measured sections before computing curvature for the overall member.

8. The method of claim 7 which further includes specifying a base length which is some increment of the overall length of the member and computing the deviation from linearity of the edge for any possible base length or greater length along the member.

9. The method of claim 8 in which the member is lumber and the deviation from linearity is a measurement of crook.

* * * * *